Oct. 2, 1923.

C. F. SNYDER

FACING OR CUTTING TOOL

Filed May 24, 1920

1,469,279

WITNESSES

INVENTOR
Charles F. Snyder
by W. G. Doolittle
Attorney.

Patented Oct. 2, 1923.

1,469,279

UNITED STATES PATENT OFFICE.

CHARLES FRENCH SNYDER, OF PITTSBURGH, PENNSYLVANIA.

FACING OR CUTTING TOOL.

Application filed May 24, 1920. Serial No. 383,687.

*To all whom it may concern:*

Be it known that I, CHARLES F. SNYDER, a citizen of the United States, residing at Pittsburgh, in the county of Allegheny and State of Pennsylvania, have invented certain new and useful Improvements in Facing or Cutting Tools, of which the following is a specification.

My invention relates to a facing or cutting tool, and more especially to a tool of the character described, particularly adapted for forming a granulated contacting face or surface on one or more metallic members, such members, for example, being employed in a joint structure.

A joint structure of the character specified, i. e., a structure including one or more granular contacting faces or surfaces, and the method of making the same, is described and claimed in a companion application filed by me June 14, 1919, Serial No. 304,178, now issued as Patent No. 1,348,667 of August 3, 1920.

The prime object of the present invention is to provide a simple and efficient tool for forming a granular surface on a metallic member or part. A tool of a character capable of being employed as a hand cutting or facing tool, but preferably designed to be employed in connection with apparatus designed for holding the tool in operative position and revolving the article to be treated while maintained in contact with the tool, or moving the tool over a surface of a fixed article, such apparatus for example, as lathes, boring mills, and drill presses.

My invention also contemplates using the tool with electric and pneumatic drill apparatus and pneumatic hammer constructions.

Figure 1:
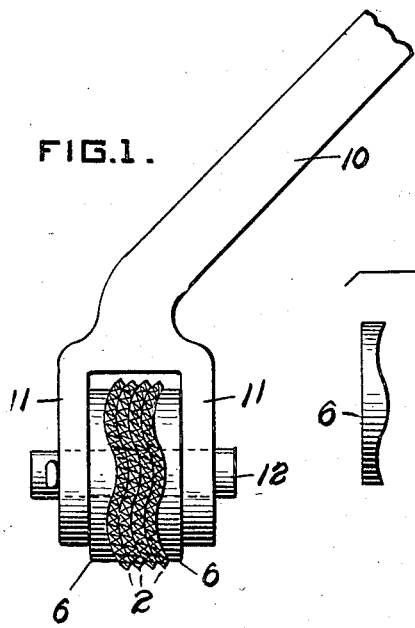
Figure 2:
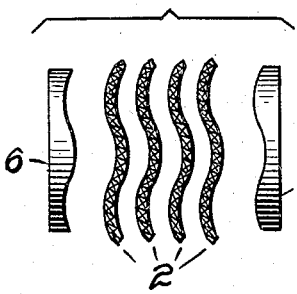
Figure 3:
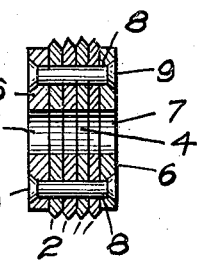
Figure 4:
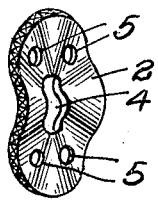
Figure 5:
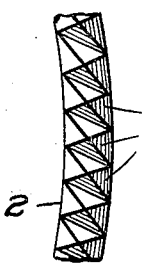
Figure 6:
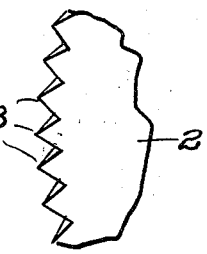
Figure 7:
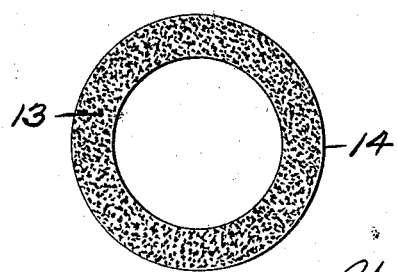

In the accompanying drawings which illustrate an application of my invention,

Fig. 1 is a front elevational view of a tool embodying my invention;

Fig. 2, an elevational view showing a plurality of cutting disks or members and clamp plates spaced apart;

Fig. 3, a vertical sectional view showing the elements of Fig. 2 assembled and secured together;

Fig. 4, a perspective view of a cutting disk or member;

Fig. 5, a front edge view;

Fig. 6, a side view;

Fig. 7, a face view of an article formed with a granular surface by the employment of a tool embodying my invention.

Referring to the drawings, and first to the form of Fig. 1, my improved cutting or facing tool designed for forming a granular surface on a metallic member, includes a plurality of similar disks 2; these disks are bent or otherwise shaped to provide each disk with a waved periphery. The periphery or edge of each disk is formed with similar cutting teeth or elements 3, and in addition thereto, each disk is formed with a central opening 4 and a plurality of smaller openings 5.

6—6 designate clamp members between which the disks are held when assembled, these clamp members having their inner faces shaped to receive the bent portions of the disks, and each formed with a central opening 7 adapted to register with the central opening 4 of a disk, and with openings 8 corresponding to and adapted to aline with the openings 5. The diameters of the clamp members 6 are slightly less than the diameters of the members or disks 2, thereby permitting the cutting edges to project outwardly from the clamps when the parts are assembled.

The disks and clamp members are secured together by means of headed pins 9 passed through the alined openings 5 and 8 of the respective members, said members being shown assembled and bound together in Fig. 3.

As above pointed out, my tool for forming a granular surface on a metallic member or part may be employed in connection with various apparatus and different forms of tool holders. In Fig. 1, I have shown a simple and efficient holder adapted to receive the tool and capable of being used in conjunction with, for example, a lathe. As shown, the tool holder includes a shank portion 10 and two spaced apart jaws 11, the latter being designed to have the tool disposed between them and loosely mounted on a non-rotative shaft 12.

Considerable care must be exercised in making and assembling the disks in order to obtain good results in the operation of forming the granular surface or surfaces, such for instance, as the surface or face 13 on the part or member 14.

The cutting disks may, of course, be made of different diameters, depending upon the character, size, etc. of the surface or part to be granulated, and the thickness of the metal from which the disks are made may be varied.

I have found, after numerous experiments, that a disk having a diameter of about one and a half inches and a thickness of .715 inch is a very desirable size. The formation of the cutting edges may be effected by the employment of a sixty degree cutter operating to cut on an angle of forty-five degrees and to a depth of .037 of an inch, after which the edge is bevelled to an included angle of sixty-six degrees.

After the peripheries are formed as described, the disks are then bent in a die to shape them into the form particularly shown by Fig. 4. The disks are assembled so that a tooth or cutting element of one disk will alternate with a tooth or element of an adjacent disk.

What I claim is:

1. A cutter for forming a granulated surface on metallic articles comprising a plurality of disks having serrated peripheral edges, the edges being sinuously curved with the curved parts of adjacent disks interfitting.

2. A cutter for forming a granulated surface on metallic articles comprising a plurality of disks having sinuously curved edges, the curved parts of adjacent disks interfitting and contacting with one another.

3. A cutter for forming a granulated surface on metallic articles comprising a plurality of disks having serrated peripheral edges, the serrations being relatively small and close together, several serrations being formed in each complete sinuous curve, the curved parts of the adjacent disks interfitting and contacting, the serrations of the disks thus overlapping one another.

4. A cutter for forming a granulated surface on metallic articles having a sinuous periphery in which are a plurality of sharp pointed teeth.

5. A cutter for forming a granular-like surface on a metallic member comprising a plurality of disks, rotatably supported and held together to rotate in unison, said disks contacting with each other throughout the greater portion of their surface, said disks being bent in a wave-like manner whereby a sinuous peripheral edge is formed on each disk, said edges having pointed teeth formed therein for digging in the surface of an article to be treated.

6. A tool for forming a granular-like surface on a metallic member comprising a rotatable member having a plurality of annular sinuous rows of pointed teeth on the periphery thereof, said teeth in adjacent rows being out of true transverse alinement with the teeth in adjacent rows.

7. A cutter element for forming a granulated appearing surface on metallic articles comprising a disk of metal having a sinuous periphery which is beveled, said sinuous beveled periphery having small cutting means formed therein for digging into the surface of an article to be treated.

In testimony whereof I affix my signature in presence of two witnesses.

CHARLES FRENCH SNYDER.

Witnesses:
J. M. GEOGHEGAN,
LOIS WINEMAN.